United States Patent
Chun et al.

(10) Patent No.: US 9,618,337 B2
(45) Date of Patent: Apr. 11, 2017

(54) APPARATUS AND METHOD FOR MEASURING ALTITUDE OF TERMINAL

(71) Applicant: Samsung Electronics Co., Ltd., Suwon-si, Gyeonggi-do (KR)

(72) Inventors: Jae-Woong Chun, Suwon-si (KR); Jeong-Min Park, Suwon-si (KR); Do-Hyoung Chung, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 316 days.

(21) Appl. No.: 14/140,314

(22) Filed: Dec. 24, 2013

(65) Prior Publication Data

US 2014/0174175 A1 Jun. 26, 2014

(30) Foreign Application Priority Data

Dec. 26, 2012 (KR) .................. 10-2012-0152994

(51) Int. Cl.
| | |
|---|---|
| *G01C 5/06* | (2006.01) |
| *G01C 5/00* | (2006.01) |
| *H04M 1/00* | (2006.01) |
| *G01L 11/00* | (2006.01) |
| *G01L 7/00* | (2006.01) |
| *H04B 7/185* | (2006.01) |

(52) U.S. Cl.
CPC .............. *G01C 5/06* (2013.01); *G01C 5/005* (2013.01); *G01L 7/00* (2013.01); *G01L 11/002* (2013.01); *H04B 7/185* (2013.01); *H04M 1/00* (2013.01)

(58) Field of Classification Search
CPC ......... G01C 5/06; G01C 5/005; G01L 11/002; G01L 7/00; H04B 7/185; H04M 1/00
USPC ................................... 73/384, 700
See application file for complete search history.

(56) References Cited

U.S. PATENT DOCUMENTS

| | | | |
|---|---|---|---|
| 6,518,918 B1 * | 2/2003 | Vannucci ................ | G01C 5/06 137/81.1 |
| 6,728,552 B2 * | 4/2004 | Chatain ................... | G01C 5/06 340/990 |
| 2006/0000286 A1 * | 1/2006 | Makela ................... | G01C 5/06 73/700 |
| 2012/0084005 A1 | 4/2012 | Fujisaki | |

FOREIGN PATENT DOCUMENTS

KR 10-2012-0035127 A 4/2012

* cited by examiner

*Primary Examiner* — Lisa Caputo
*Assistant Examiner* — Nathaniel T Woodward
(74) *Attorney, Agent, or Firm* — Jefferson IP Law, LLP

(57) ABSTRACT

An apparatus and a method for measuring an altitude of a terminal which can correct an altitude error according to temporal and spatial changes are provided. The apparatus includes an atmospheric pressure measuring unit for measuring an atmospheric pressure from a barometer included in the terminal, a position determiner for measuring position information of the terminal, and a controller for, when a reference atmospheric pressure reception period is not generated, predicting a current reference atmospheric pressure by using previously received reference atmospheric pressures and measuring a current altitude by using the predicted reference atmospheric pressure and the measured atmospheric pressure.

8 Claims, 8 Drawing Sheets

APPARATUS AND METHOD FOR MEASURING ALTITUDE OF TERMINAL

PRIORITY

This application claims the benefit under 35 U.S.C. §119 (a) of a Korean patent application filed on Dec. 26, 2012 in the Korean Intellectual Property Office and assigned Serial No. 10-2012-0152994, the entire disclosure of which is hereby incorporated by reference.

BACKGROUND OF THE INVENTION

1. Field of the Invention

The present invention relates to an apparatus and a method for measuring an altitude of a terminal More particularly, the present invention relates to an apparatus and a method for measuring an altitude of a terminal which can correct an altitude error according to temporal and spatial changes.

2. Description of the Related Art

Currently, a terminal, such as a smart phone, may be equipped with many different applications and functions including a barometer. Using the barometer, a value of atmospheric pressure at a user's current position may be measured.

FIG. 1 is a diagram for describing a driving principle of a barometer according to the related art.

Referring to FIG. 1, based on the driving principle of the barometer, a crystal within the barometer checks a vibration due to the atmospheric pressure and transmits the vibration as a signal to measure the atmospheric pressure. To check the vibration, each crystal is included within a cell. In general, a barometer uses an average of three cells to obtain a reliable value of atmospheric pressure without causing the cost of the device to become too high. That is, the price becomes more expensive as the number of cells increases.

Also, while the terminal may measure the atmospheric pressure using the barometer, the barometer is generally only used for measuring an altitude.

As an alternative to using a barometer, a Global Positioning System (GPS) may be used because the GPS information includes altitude information as well as longitude/latitude information. However, the altitude information has large error ranges from several meters to dozens of meters. Therefore, the GPS is not suitable for precisely measuring an altitude.

Furthermore, since the GPS cannot be used indoors, it is not possible to use a service such as Indoor Navigation.

FIG. 2 is a graph illustrating a relation between an atmospheric pressure and an altitude according to the related art.

A reason why an altitude can be calculated through a barometer as illustrated in FIG. 2 is that there is a constant relation between the atmospheric pressure and the altitude. On earth, as an altitude becomes higher, the atmospheric pressure becomes lower. Since pressure is based on weight, as an altitude becomes higher, air becomes insufficient and thus the weight of air becomes lighter.

The relation between the atmospheric pressure and the altitude may be described through equation (1) below.

However, in order to calculate an altitude value according to the corresponding atmospheric pressure through Equation (1) below, a reference atmospheric pressure, such as the atmospheric pressure in a particular altitude, is required. Accordingly, a site, such as a weather center, provides an atmospheric pressure value at sea level (altitude 0 m).

$$\rho = \rho_b \cdot \exp\left[\frac{-g_0 \cdot M \cdot (h - h_b)}{R^* \cdot T_b}\right] \quad (1)$$

$\rho$: atmospheric pressure (kg/m3)
$\rho_b$: reference atmospheric pressure
h: altitude (geopotential meters)
$h_b$: reference altitude (0 m)
$T_b$: standard temperature constant (k)
$R^*$: Universal gas constant for air: 8.31432 N·m/(mol·K)
$g_0$: acceleration of gravity (9.80665 m/s²)
M: Molar mass of Earth's air (0.0289644 kg/mol)

As defined in Equation (1), in order to acquire the altitude through the atmospheric pressure measured by the barometer, the reference atmospheric pressure is required. In general, the reference atmospheric pressure is 1013.25 mbar (760 mmHg) at sea level (i.e., 0 m). Based on the reference atmospheric pressure, an altitude h may be calculated when an atmospheric pressure is p. However, such a method provides an accurate value only when the atmospheric pressure at sea level in a measured area corresponds to the reference atmospheric pressure. However, the atmospheric pressure at sea level may be different according to weather conditions time of day, and the season of the year.

Accordingly, in order to calculate an accurate altitude of a current position, external information, such as reference atmospheric pressure information, is required. However, there is a realistic limitation in the ability to collect the latest information all the time. Particularly, when the atmospheric pressure at sea level of the current position is acquired from the weather center, there are at least two risk factors as listed below.

1. Temporal Risk Factor

The first factor is time. Receiving the atmospheric pressure at sea level of the current position every minute or every second may be the best method. However, since the weather center mainly measures the atmospheric pressure at sea level every thirty minutes or every hour, it is realistically difficult to use the best method.

Actually, thirty minutes and one hour correspond to a long time in a viewpoint of atmospheric pressure. During one day, there is a difference in the atmospheric pressure according to morning, afternoon, and evening, and there is deviation for each season. Accordingly, an error is actually generated during such a time. Therefore, a technology for correcting the reference atmospheric pressure by considering the error even though time goes by is required.

2. Spatial Risk Factor

The second factor is space. Strictly speaking, the atmospheric pressure at sea level refers to the atmospheric pressure at sea level at the weather station. Accordingly, there is no problem when a distance between the weather station and the terminal is short. However, reliability of reference atmospheric pressure information decreases when the distance is long.

Further, land movement, ranging from dozens of kilometers to hundreds of kilometers per hour, are currently possible due to the development of land transportation. However, when movement to a particular area is made before the reference atmospheric pressure is updated, an error is generated because the reference atmospheric pressure of a previous area is used as the reference.

Therefore, a need exists for an apparatus and a method for measuring an altitude of a terminal which can correct an altitude error by extracting a reference atmospheric pressure corresponding to a spatial change and using the extracted reference atmospheric pressure.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide an apparatus and a method for measuring an altitude of a terminal which can correct an altitude error by extracting a reference atmospheric pressure corresponding to a spatial change and using the extracted reference atmospheric pressure.

Another aspect of the present invention is to provide an apparatus and a method for measuring an altitude of a terminal which can correct an altitude error generated according to a temporal change.

Still another aspect of the present invention is to provide an apparatus and a method for measuring an altitude of a terminal which can correct an altitude error generated according to a distance between a weather station and the terminal.

Yet another aspect of the present invention is to provide an apparatus and a method for measuring an altitude of a terminal which can correct an altitude error generated according to a spatial movement of the terminal.

In accordance with an aspect of the present invention, an apparatus for measuring an altitude of a terminal is provided. The apparatus includes an atmospheric pressure measuring unit for measuring an atmospheric pressure from a barometer included in the terminal, a position determiner for measuring position information of the terminal, and a controller for, when a reference atmospheric pressure reception period is not generated, predicting a current reference atmospheric pressure by using previously received reference atmospheric pressures, and for measuring a current altitude by using the predicted reference atmospheric pressure and the measured atmospheric pressure.

In accordance with another aspect of the present invention, an apparatus for measuring an altitude of a terminal is provided. The apparatus includes an atmospheric pressure measuring unit for measuring an atmospheric pressure from a barometer included in the terminal, a position determiner for measuring position information of the terminal, and a controller for, when a plurality of reference atmospheric pressures according to the position information of the terminal are received from a server, assigning a weight to each of the plurality of reference atmospheric pressures according to a relative distance between each of weather stations where the plurality of reference atmospheric pressures are measured and the terminal, for determining a reference atmospheric pressure by adding the plurality of reference atmospheric pressures according to the weight, and for measuring a current altitude by using the determined reference atmospheric pressures and the measured atmospheric pressure.

In accordance with another aspect of the present invention, an apparatus for measuring an altitude of a terminal is provided. The apparatus includes an atmospheric pressure measuring unit for measuring an atmospheric pressure from a barometer included in the terminal, a position determiner for measuring position information of the terminal, and a controller for, when a reference atmospheric pressure reception period is not generated and a position of the terminal escapes from a reference distance, transmitting the position information of the terminal and a reference atmospheric pressure request to a server, and for measuring, when a reference atmospheric pressure according to the position information of the terminal is received from the server, a current altitude by using the received reference atmospheric pressure and the measured atmospheric pressure.

In accordance with another aspect of the present invention, a method of measuring an altitude of a terminal is provided. The method includes predicting a current reference atmospheric pressure by using previously received reference atmospheric pressures when a reference atmospheric pressure reception period is not generated, and measuring a current altitude by using the predicted reference atmospheric pressure and an atmospheric pressure measured by a barometer included in the terminal.

In accordance with another aspect of the present invention, a method of measuring an altitude of a terminal is provided. The method includes, when a plurality of reference atmospheric pressures according to the position information of the terminal are received from a server, assigning a weight to each of the plurality of reference atmospheric pressures according to a relative distance between each of weather stations where the plurality of reference atmospheric pressures are measured and the terminal, and determining a reference atmospheric pressure by adding the plurality of reference atmospheric pressures according to the weight, and measuring a current altitude by using the determined reference atmospheric pressures and an atmospheric pressure measured by a barometer included in the terminal.

In accordance with another aspect of the present invention, a method of measuring an altitude of a terminal is provided. The method includes, when a reference atmospheric pressure reception period is not generated and a position of the terminal escapes from a reference distance, transmitting position information of the terminal and a reference atmospheric pressure request to a server, and, when a reference atmospheric pressure according the position information of the terminal is received from the server, measuring a current altitude by using the received reference atmospheric pressure and an atmospheric pressure measured by a barometer included in the terminal.

The present invention provides an apparatus and a method for measuring an altitude of a terminal, thereby creating an effect of providing a more accurate and useful altitude by correcting an altitude error according to temporal and spatial changes. For example, when a user takes an elevator in a building, a terminal of the user may determine whether the elevator ascends or descends and at which floor the elevator stops, so that the user may receive additional information according to the determination. Further, when the user travels with a car, the terminal may determine that the user is in mountain area, and calculate an accurate altitude by receiving a reference atmospheric pressure in accordance with an area even though the user moves to another area. Alternatively, even in a state where the terminal does not have a $3^{rd}$ Generation (3G) or Long Term Evolution (LTE) connection while climbing a mountain, the terminal may provide an optimal altitude by modeling reference atmospheric pressure information previously received internally.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

A terminal according to an exemplary embodiment of the present invention includes a portable terminal and a fixed terminal. Here, the portable terminal is an easily carried electronic device which may be a video telephone, a mobile phone, a smart phone, an International Mobile Telecommunication 2000 (IMT-2000) terminal, a Wideband Code Division Multiple Access (WCDMA) terminal, a Universal Mobile Telecommunication Service (UMTS) terminal, a Personal Digital Assistant (PDA), a Portable Multimedia Player (PMP), a Digital Multimedia Broadcasting (DMB) terminal, an E-book, a portable computer (notebook, tablet or the like), a digital camera, or the like. Further, the fixed terminal may be a desktop personal computer or the like.

Figure 1:
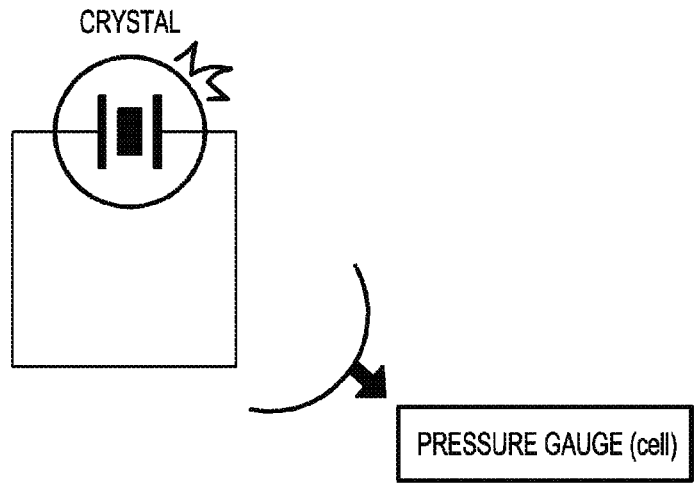
FIG. 1 is a diagram for describing a driving principle of a barometer according to the related art.
Figure 2:
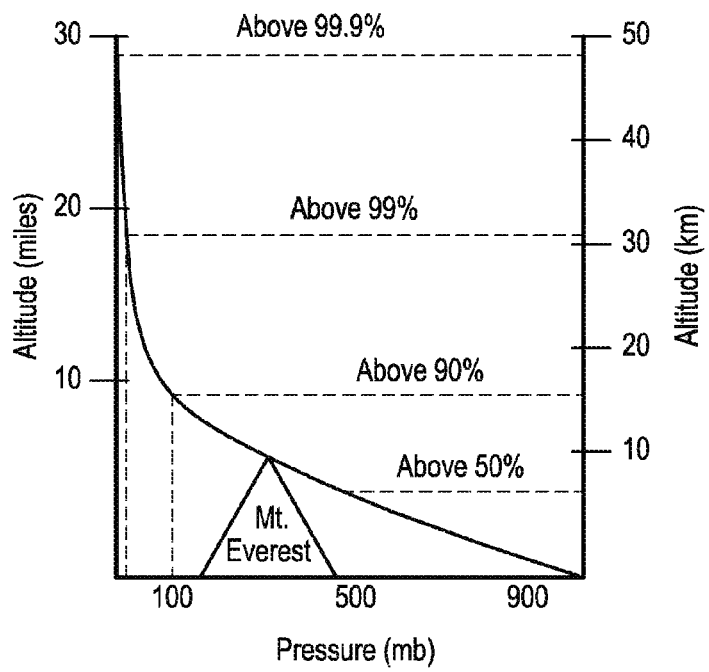
FIG. 2 is a graph illustrating a relation between an atmospheric pressure and an altitude according to the related art.
Figure 3:
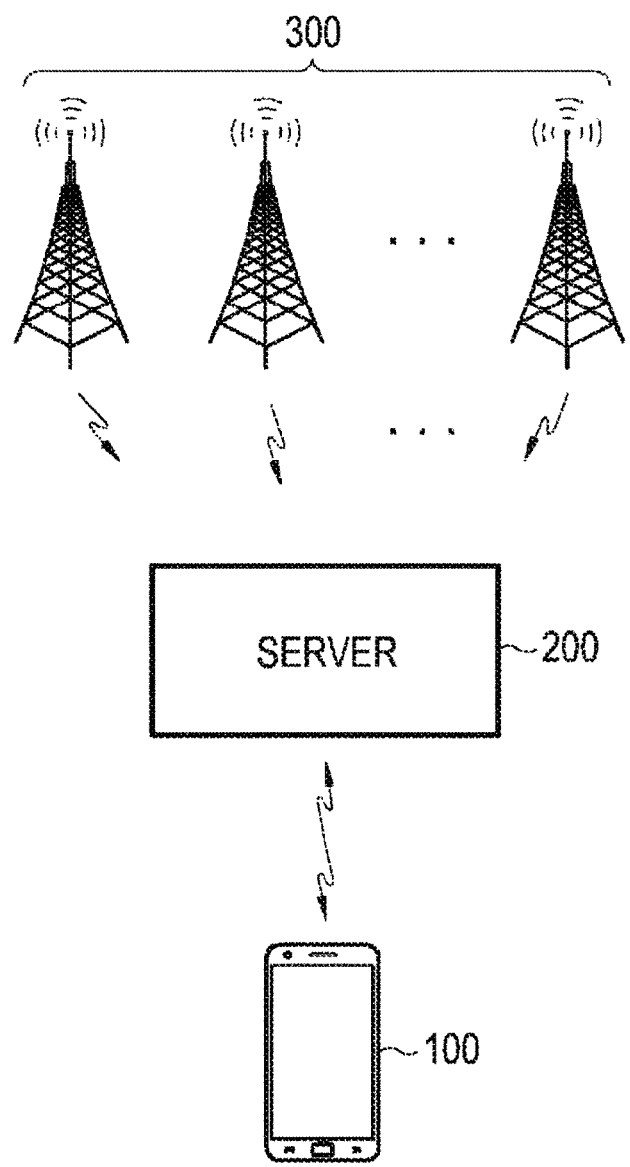
FIG. 3 is a configuration diagram of a system for measuring an altitude in a terminal according to an exemplary embodiment of the present invention.

FIG. 3 is a configuration diagram of a system for measuring an altitude in a terminal according to an exemplary embodiment of the present invention.

Referring to FIG. 3, the system for measuring an altitude in the terminal includes a terminal 100, a server 200, and a weather station 300.

The terminal 100 periodically makes a request for position information of the terminal and a reference atmospheric pressure to the server 200 and measures a current altitude by using the reference atmospheric pressure received from the server 200. A configuration of the terminal will be described in more detail with reference to FIG. 4.

The server 200 receives values of the atmospheric pressures at sea level from a plurality of weather stations 300 located in different positions as the reference atmospheric pressures. Further, when the reference atmospheric pressure is requested from the terminal 100, the server 200 transmits one or more reference atmospheric pressures corresponding to position information of the terminal received from the terminal and position information on the weather stations where the one or more reference atmospheric pressures are measured to the terminal 100.

The plurality of weather stations 300 are disposed at regular intervals, and periodically measure values of the atmospheric pressures at sea level and then transmit the measured values to the server 200.

Figure 4:
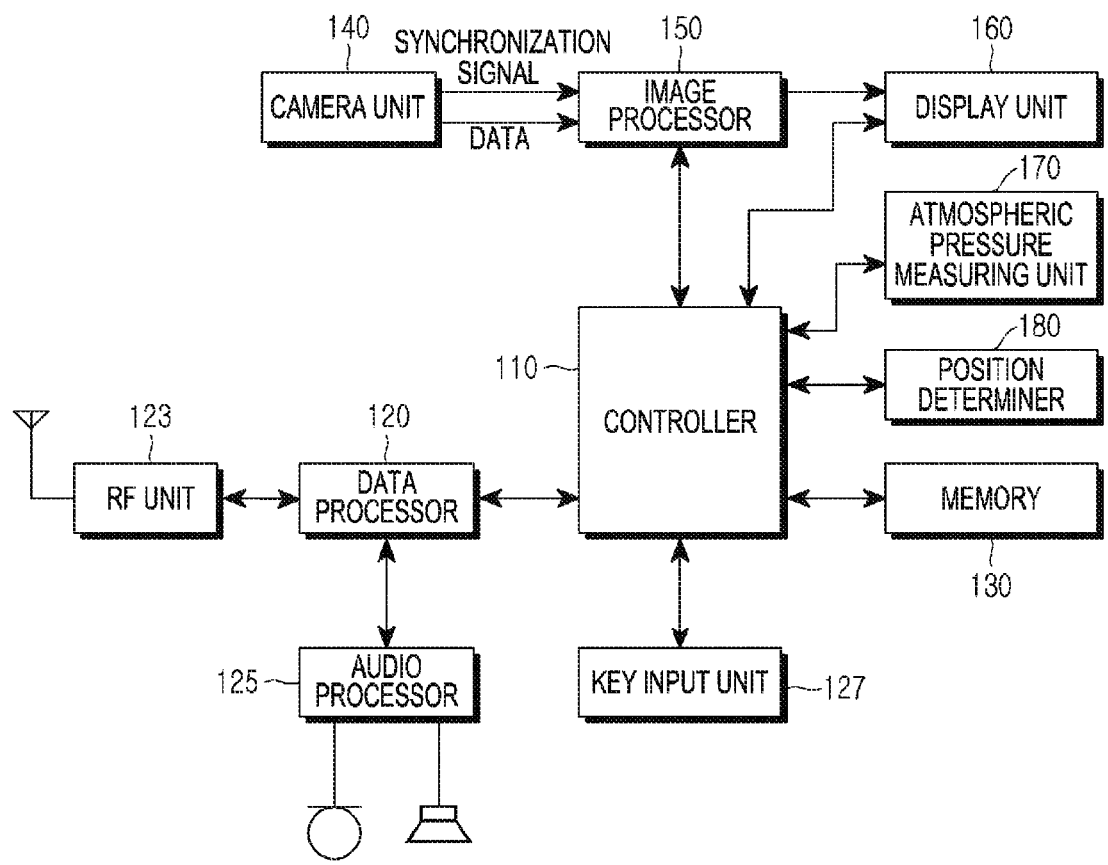
FIG. 4 is a configuration diagram of a terminal according to an exemplary embodiment of the present invention.

FIG. 4 is a diagram illustrating a configuration of a terminal according to an exemplary embodiment of the present invention.

Referring to FIG. 4, a Radio Frequency (RF) unit 123 performs the wireless communication function of the terminal. The RF unit 123 includes an RF transmitter for up-converting and amplifying a frequency of a transmitted signal and an RF receiver for low noise-amplifying a received signal and down-converting a frequency. A data processor 120 includes a transmitter for encoding and modulating the transmitted signal and a receiver for demodulating and decoding the received signal. That is, the data processor 120 may include a modem and a codec. Here, the codec includes a data codec for processing packet data and an audio codec for processing an audio signal, such as voice. An audio processor 125 performs a function of reproducing a reception audio signal output from the audio codec of the data processor 120 or transmitting a transmission audio signal generated from a microphone to the audio codec of the data processor 120.

Further, according to an exemplary embodiment of the present invention, the RF unit 123 transmits the current position of the terminal to the server 200 and receives one or more reference atmospheric pressures from the server 200.

A key input unit 127 includes keys for inputting number and character information and function keys for setting various functions.

A memory 130 may include a program memory and data memories. The program memory may store programs for controlling a general operation of the terminal and programs for controlling an operation of extracting the reference atmospheric pressure for determining an accurate altitude. Further, the data memory performs a function of temporarily storing data generated while the programs are performed.

In addition, the memory 130 stores the reference atmospheric pressure received from the server 200 according to an exemplary embodiment of the present invention.

A controller 110 performs a function of controlling a general operation of the terminal.

According to an exemplary embodiment of the present invention, when a reference atmospheric pressure reception period is not generated, the controller 110 predicts a current atmospheric pressure by using previously received atmospheric pressures and measures a current altitude by using the predicted reference atmospheric pressure and atmospheric pressure measured by an atmospheric pressure measuring unit 170.

At this time, extrapolation may be used as a method of predicting the current atmospheric pressure by using the previously received atmospheric pressures.

Further, according to an exemplary embodiment of the present invention, when the reference atmospheric pressure reception period is generated, the controller 110 transmits position information of the terminal, extracted from a position determiner 180, and a reference atmospheric pressure request to server 200. When the reference atmospheric pressure according to the position information of the terminal is received from the server 200, the controller 110 measures an altitude by using the received reference atmospheric pressure and the atmospheric pressure measured by the atmospheric pressure measuring unit 170.

In addition, according to an exemplary embodiment of the present invention, when the reference atmospheric pressure reception period is generated, the controller 110 transmits the position information of the terminal extracted from the position determiner 180 and the reference atmospheric pressure request to the server 200.

When a plurality of reference atmospheric pressures according to the position information of the terminal are received from the server 200, the controller 110 assigns a weight to each of the plurality of reference atmospheric pressures according to a relative distance between each of the weather stations 300, where the plurality of atmospheric pressures are measured, and the terminal 100. At this time, the controller 110 assigns a higher weight as the distance between each of the weather stations where the plurality of atmospheric pressures are measured and the terminal is shorter.

Further, the controller 110 determines reference atmospheric pressure by adding the plurality of reference atmospheric pressures according to the weight and measures the current altitude by using the determined reference atmospheric pressure and the atmospheric pressure measured by the atmospheric pressure measuring unit.

In addition, when weather information received from a weather information providing server is determined as weather information in which an altitude error may be generated, the controller 110 makes a request for reducing the reference atmospheric pressure reception period received from the server 200 or increasing the number of weather stations providing the reference atmospheric pressure according to a position of the terminal to the server 200.

When weather is unstable (by considering a wind speed, a wind direction, a weather condition, and the like), a change in atmospheric pressure increases, thereby generating a current altitude error. When weather information (e.g., the wind speed, the wind direction, the weather condition, and the like) received from the weather information providing server is determined as weather information in which a preset altitude error may be generated, a reception period of the reference atmospheric pressure received from the server is reduced through a first method. For example, by reducing the reception period in the two hour unit to the one hour unit, the reference atmospheric pressure is updated every hour. However, the reduction is possible only when the weather information providing server provides the weather information at a period that is shorter than the reception period of the reference atmospheric pressure. A second method is to increase the number of weather stations referring the reference atmospheric pressure based on the current position of the terminal. According to a modeling method, the reference atmospheric pressure of the current position may be calculated by collecting information on many neighboring weather stations. As the amount information increases, a predictable range becomes wider and various modelings may be performed.

Further, when a plurality of reference atmospheric pressures according to the position information of the terminal 100 are received from the server 200, the controller 110 determines whether there is a weather station located within a predetermined distance from the terminal among the weather stations in which the plurality of atmospheric pressures are measured. In addition, when a weather station located within the predetermined distance (d) from the terminal exists, the controller 110 measures the current altitude by using reference atmospheric pressure of the weather station located within the predetermined distance (d) from the terminal and the atmospheric pressure measured by the atmospheric pressure measuring unit 170.

Furthermore, when the weather information received from the weather information providing server is determined as weather information in which the altitude error may be generated, the controller 110 may reduce the altitude error which can be generated due to an increase in an atmospheric pressure change by reducing a range of the predetermined distance (d) between the terminal 100 and the weather station 300 through a third exemplary method.

According to an exemplary embodiment of the present invention, in the case where the reference atmospheric pressure reception period is not generated, when the terminal 100 travels beyond the predetermined range, the controller 110 transmits the position information of the terminal 100 extracted from the position determiner 180 and the reference atmospheric pressure request to server 200. When the reference atmospheric pressure according to the position information of the terminal is received from the server 200, the controller 110 measures the altitude by using the received reference atmospheric pressure and the atmospheric pressure measured by the atmospheric pressure measuring unit 170.

Further, according to an exemplary embodiment of the present invention, when the weather information received from the weather information providing server is determined as weather information in which the altitude error may be generated, the controller 110 may organically change and control the predetermined range through a fourth exemplary method.

The atmospheric pressure measuring unit 170 extracts atmospheric pressure through a barometer (not shown) included in the terminal and provides the extracted atmospheric pressure to the controller 110.

The position determiner 180 measures position information of the current terminal by using a positioning system, such as a Global Positioning System (GPS) or Wi-Fi Positioning System (WPS), and provides the measured position information to the controller 110.

A camera unit 140 includes a camera sensor for photographing image data and converting an optical signal to an electrical signal and a signal processor for converting an analog image signal photographed by the camera sensor to digital data. Here, it is assumed that the camera sensor is a Charge Coupled Device (CCD) or Complementary Metal Oxide Semiconductor (CMOS) sensor, and the signal processor may be implemented by a Digital Signal Processor (DSP). Further, the camera sensor and the signal processor may be implemented integrally or separately.

An image processor 150 performs Image Signal Processing (ISP) for displaying an image signal output from the camera unit 140 on a display unit 160. The ISP performs functions such as gamma correction, interpolation, spatial change, image effect, image scale, AWB, AE, AF and the like. Accordingly, the image processor 150 processes the image signal output from the camera unit 140 in the unit of frames and outputs frame image data in accordance with a characteristic and a size of the display unit 160. Further, the image processor 150 includes an image codec and performs a function of compressing the frame image data displayed on the display unit 160 according to a set method or reconstructing the compressed frame image data into original frame image data. Here, the image codec may be a JPEG codec, an MPEG4 codec, a Wavelet codec or the like. It is assumed that the image processor 150 includes an On Screen Display (OSD) function, and the image processor 150 may output screen display data according to a size of the displayed screen under control of the controller 110.

The display unit 160 displays an image signal output from the image processor 150 and displays user data output from the controller 110. Here, the display unit 160 may use a Liquid Crystal Display (LCD). In this case, the display unit 160 may include an LCD controller, a memory for storing image data, and an LCD display device. Here, when the LCD is implemented as a touch screen type, the LCD may operate as an input unit. At this time, the display unit 160 may display keys, such as the key input unit 127.

Further, when the display unit 160 is implemented as the touch screen type and thus used as a touch screen unit, the touch screen unit may be configured having a Touch Screen Panel (TSP) including a plurality of sensor panels, and the plurality of sensor panels may include a capacitive sensor panel capable of recognizing a hand touch and an electromagnetic induction sensor panel capable of detecting a fine touch made by a touch pen.

Operations for measuring, by the terminal, an altitude by using reference atmospheric pressure extracted in accordance with temporal and spatial changes will be described in more detail with reference to FIGS. 5 to 8.

Figure 5:
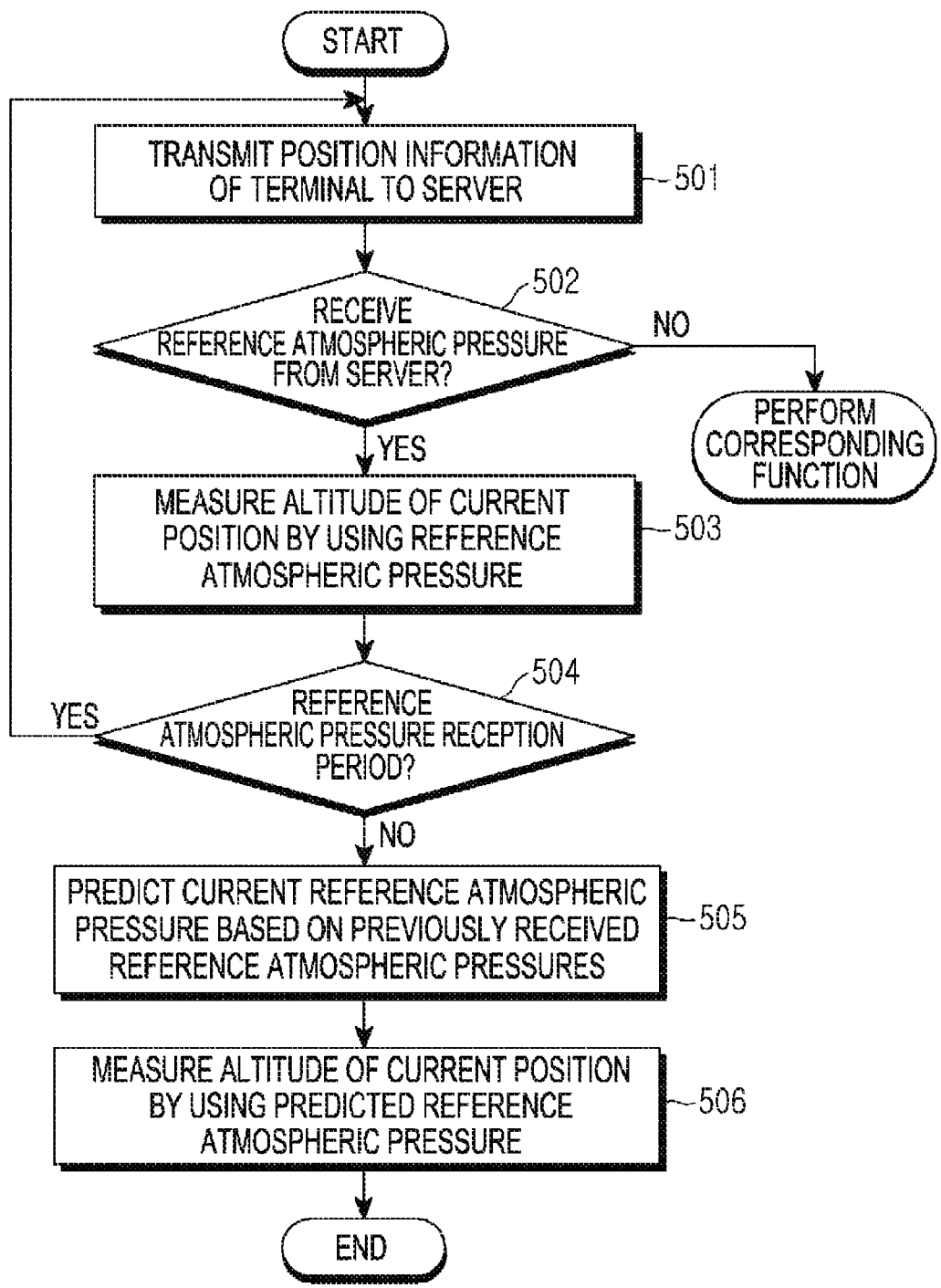
FIG. 5 is a flowchart illustrating a process of measuring an altitude according a temporal change in a terminal according to an exemplary embodiment of the present invention.

FIG. 5 is a flowchart illustrating a process of measuring an altitude according to a temporal change by the terminal according to an exemplary embodiment of the present invention.

Hereinafter, an exemplary embodiment of the present invention will be described in more detail with reference to FIG. 5 together with FIGS. 3 and 4.

Referring to FIG. 5, when a particular application requiring altitude measurement is executed in the terminal 100, the controller 110 transmits current position information of the terminal 100 measured by the position determiner 180 to the server 200 in step 501.

In step 502, the controller 110 determines if reference atmospheric pressure is received from the server 200. If the controller 110 determines reception of the reference atmospheric pressure in step 502, the controller performs step 503 by measuring an altitude (h) using the received reference atmospheric pressure and atmospheric pressure measured by the atmospheric pressure measuring unit 170. For example, the controller may measure the altitude (h) using equation (1) above. Alternatively, if the controller 110 does not determine reception of the reference atmospheric pressure in step 502, the controller 110 performs a corresponding function.

The server 200 transmits reference atmospheric pressure received from the weather stations located within a predetermined range from the current position of the terminal through the position information of the terminal received from the terminal 100 to the terminal 100, so that the terminal 100 may receive one or more atmospheric pressures from the server 200.

Accordingly, when a plurality of reference atmospheric pressures are received from the server 200, the terminal 100 may use one atmospheric pressure generated by adding and averaging the plurality of reference atmospheric pressures.

In step 504, the controller 110 determines if a preset reference atmospheric pressure reception period is generated. If the controller detects the generation of the reference atmospheric pressure reception period in step 504, the controller performs steps 501 to 503 again.

However, if the controller 110 does not detect generation of the preset reference atmospheric pressure reception period, that is, before a next reference atmospheric pressure reception period is generated, the controller 110 predicts a current reference atmospheric pressure based on previously received reference atmospheric pressures stored in the memory 130 in step 505, and measures the altitude in the current position of the terminal using the predicted reference atmospheric pressure in step 506.

The atmospheric pressure measured through the barometer included in the terminal 100 is changed as time goes by, but the reference atmospheric pressure (e.g., atmospheric pressure at sea level) is fixed before the next reference atmospheric pressure reception period is generated.

Accordingly, the reference atmospheric pressure should be corrected as time goes by. However, since the period of the reference atmospheric pressure received from the server is long and is received through wireless communication, large power consumption and a charging problem may occur.

Therefore, in an exemplary embodiment of the present invention, the current reference atmospheric pressure is predicted based on the previously received reference atmospheric pressures before the next reference atmospheric pressure reception period is generated. At this time, extrapolation may be used as a prediction method. The extrapolation corresponds to a modeling method of predicting a current or future value through past information.

Since the reference atmospheric pressure predicted based on the previously received atmospheric pressures is continuously changed as time goes by, the current altitude where the terminal is located may be calculated by extracting the reference atmospheric pressure according to the current position of the terminal without a wireless communication function and using the extracted reference atmospheric pressure before the next reference atmospheric pressure reception period is generated.

For example, in a case where the reference atmospheric pressure reception period is the one hour unit, when a reference atmospheric pressure (a1) is received from the server 200 at 10 a.m., a reference atmospheric pressure changed according to the time is predicted using previously received reference atmospheric pressures and provided before the next reference atmospheric pressure reception period of 11 a.m.

Accordingly, when the past reference atmospheric pressures received before 10 a.m. have continuously increased, it is predicted that the reference atmospheric pressures between 10 a.m. and 11 a.m. will have similarly increased. Since the modeling method of predicting a future value by using past information uses an already known technology, such as extrapolation, a detailed description thereof will be omitted.

Figure 6:
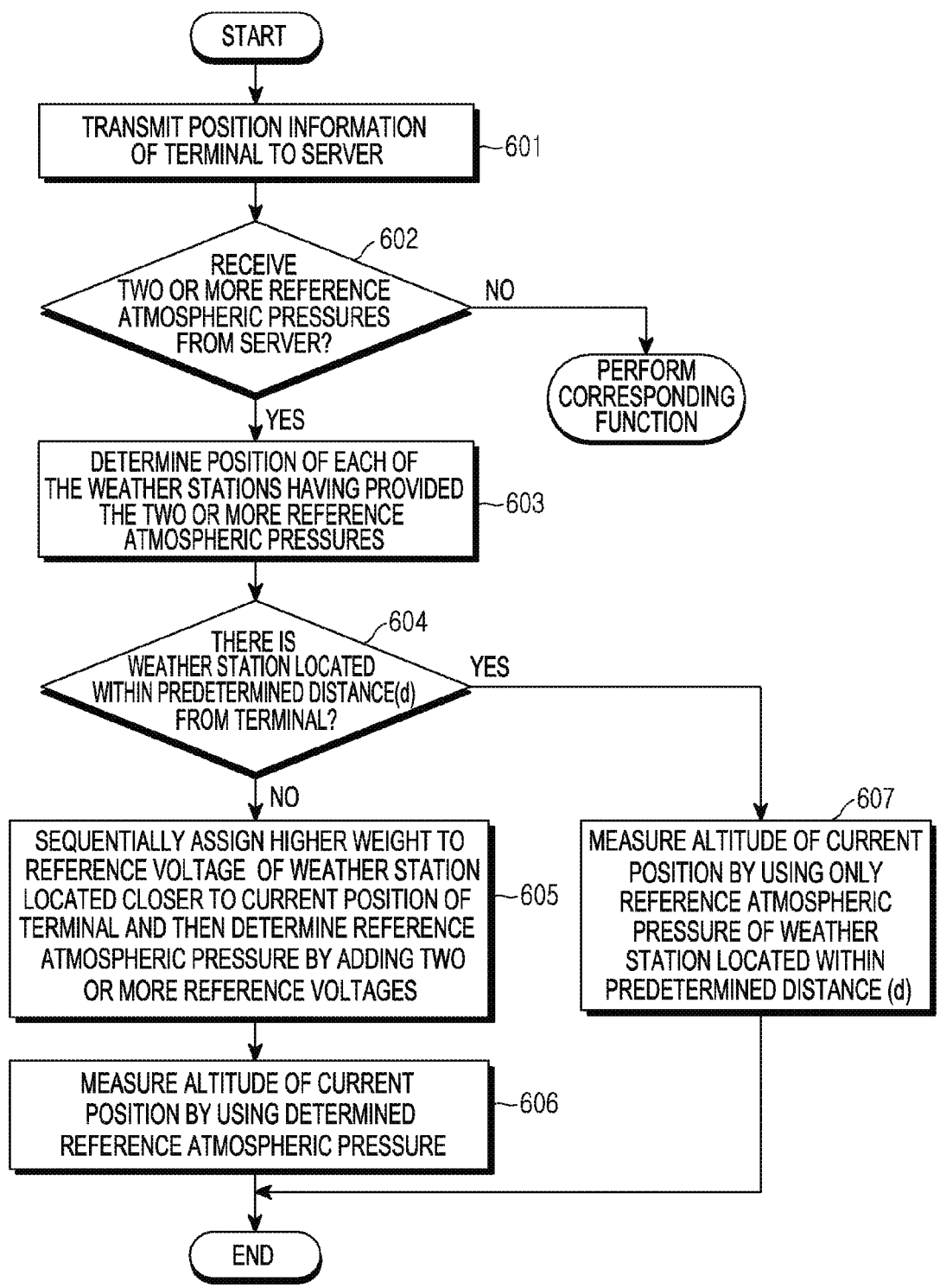
FIG. 6 is a flowchart illustrating a process of measuring an altitude according a spatial position change in a terminal according to an exemplary embodiment of the present invention.
Figure 7A:
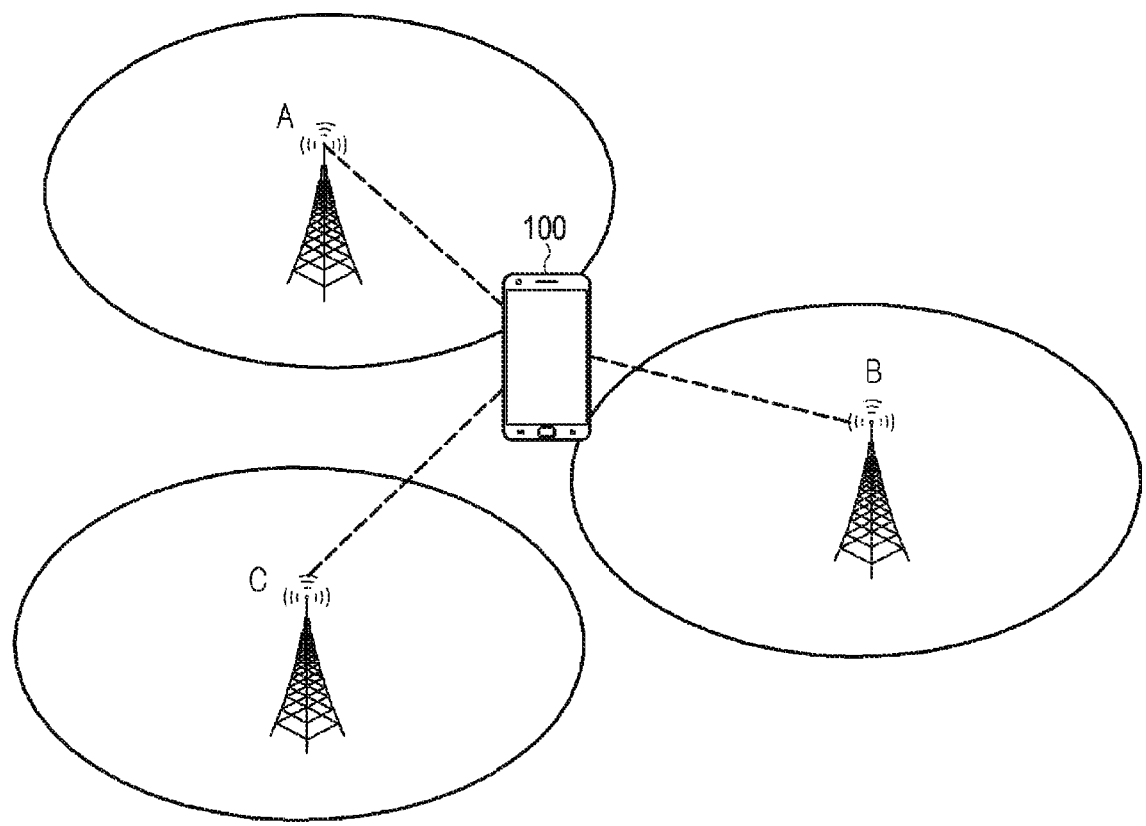
FIG. 7A and FIG. 7B are diagrams for describing FIG. 6 according to an exemplary embodiment of the present invention.
Figure 7B:
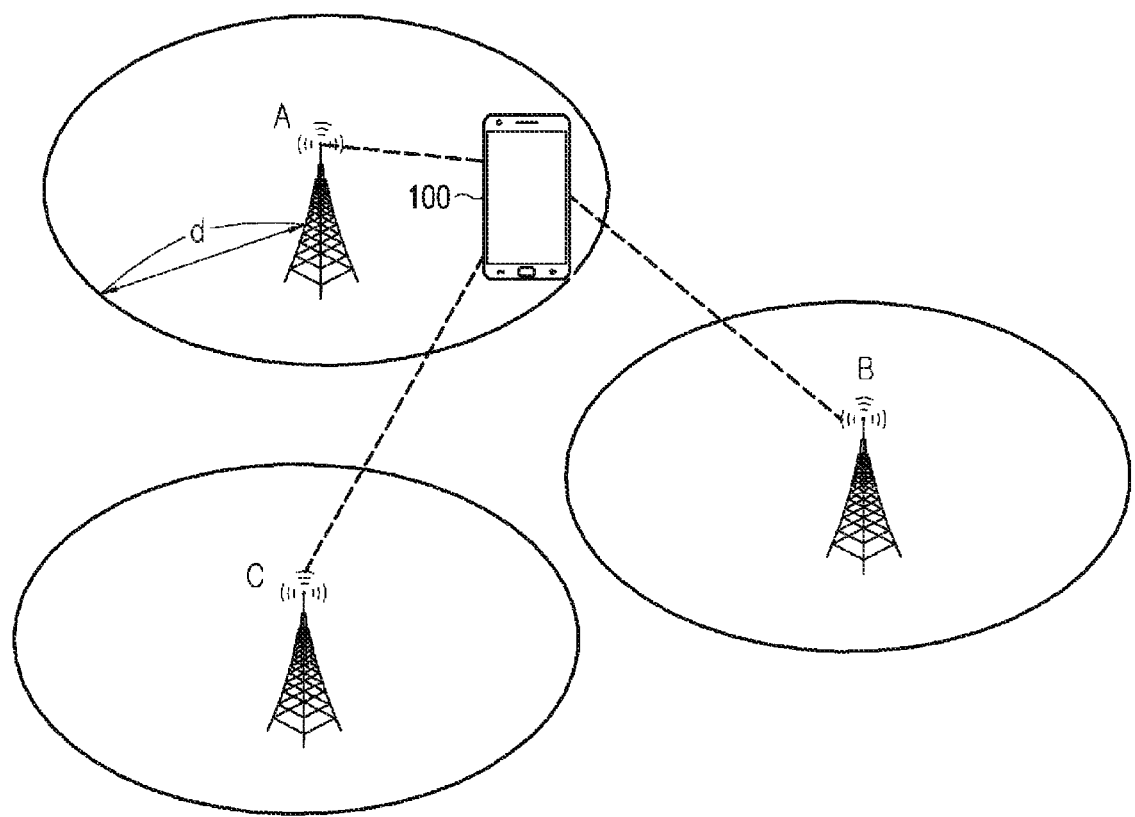

FIG. 6 is a flowchart illustrating a process of measuring an altitude according to a spatial position change by the terminal according to an exemplary embodiment of the present invention, and FIGS. 7A and 7B are diagrams for describing FIG. 6 according to an exemplary embodiment of the present invention.

Hereinafter, an exemplary embodiment of the present invention will be described in detail with reference to FIGS. 6, 7A and 7B together with FIGS. 3 and 4.

Referring to FIG. 6, when a particular application requiring altitude measurement is executed in the terminal 100, the controller 110 transmits current position information of the terminal 100 measured by the position determiner 180 to the server 200 in step 601.

In step 602, the controller 110 determines if two or more reference atmospheric pressures are received from the server 200. If the controller 110 determines reception of the reference atmospheric pressures in step 602, the controller 110 determines a position of each of the weather stations having provided the two or more reference atmospheric pressures in step 603. When the two or more reference atmospheric pressures are received from the server 200, position information of the weather stations providing the reference atmospheric pressures is received together. Alternatively, if the controller 110 does not determine reception of the reference atmospheric pressures in step 602, the controller 110 performs a corresponding function.

In step 604, the controller 110 determines whether there is a weather station located within a preset certain distance (d) from the terminal 100 among the weather stations providing the two or more reference atmospheric pressures.

When it is determined in step 604 that there is no weather station located within the preset certain distance (d) from the terminal 100, the controller 110 assigns a higher weight to a reference atmospheric pressure of the weather station located closer to the current position of the terminal 100 and determines one reference atmospheric pressure by adding the two or more reference atmospheric pressures in step 605. In an exemplary implementation, step 604 may be omitted, and the controller 110 may perform step 605 when the two or more reference atmospheric pressures are received from the server.

In step 606, the controller 110 measures a current altitude (h) where the terminal is located using the reference atmospheric pressure determined and the atmospheric pressure measured by the atmospheric pressure measuring unit 170. In an exemplary implementation, the controller 110 may determine the current altitude (h) using Equation (1) above.

In a description of the steps through FIG. 7A, when three reference atmospheric pressures of weather stations A, B, and C are received from the server 200 according to the current position of the terminal 100, if it is assumed that an order of the weather stations that are located closer to the terminal 100 corresponds to the weather stations A, B, and C, and the reference atmospheric pressures of the weather stations are 10, 12, and 14, weight values of the weather station A(1), the weather station B(2), and the weather station C(3) are 6/11, 3/11 and 2/11.

Accordingly, a sum of the reference atmospheric pressures provided from the weather stations A, B, and C according to the weights is "(6/11*10)+(3/11*12)+(2/11*14) =11.272", and thus the reference atmospheric pressure may be determined as "11.272".

As described above, as the weather station is located closer to the current position of the terminal 100, a reference weight of the reference atmospheric pressure value of the corresponding weather station becomes larger.

Further, when weather information is received from the weather information providing server and is determined as weather information in which an altitude error may be generated, the controller 110 may make a request for reducing a reference atmospheric pressure reception period received from the server 200 or for increasing the number of weather stations 300 providing the reference atmospheric pressure according to the position of the terminal 100 to the server 200.

In addition, if the controller 110 determines that there is a weather station located within the preset certain distance (d) from the terminal 110, the controller 100 extracts only the reference atmospheric pressure of the weather station located within the certain distance (d) and measures the current altitude (h) where the terminal 100 is located by using the extracted reference atmospheric pressure and the atmospheric pressure extracted by the atmospheric pressure measuring unit 170 in step 607. In an exemplary implementation, the controller 110 may determine the current altitude (h) using Equation (1).

In a description of the steps through FIG. 7B, in the case where three reference atmospheric pressures of the weather stations A, B, and C are received from the server 200 according to the current position of the terminal 100, the weather station A of the three weather stations A, B, and C is located within the certain distance (d1) from the terminal 100, so that the terminal 100 measures the current altitude (h) where the terminal 100 is located by using only the reference atmospheric pressure of the weather station A of the three weather stations A, B, and C.

Further, when weather information is received from the weather information providing server and is determined as weather information in which an altitude error may be generated, the controller 110 may reduce a range of the certain distance between the terminal 100 and the weather station 300.

In addition, in FIG. 6, the atmospheric pressure may be predicted by using previously received reference atmospheric pressures through steps 504 to 506 of FIG. 5 and used as the current atmospheric pressure before the next reference atmospheric pressure reception period is generated.

Figure 8:
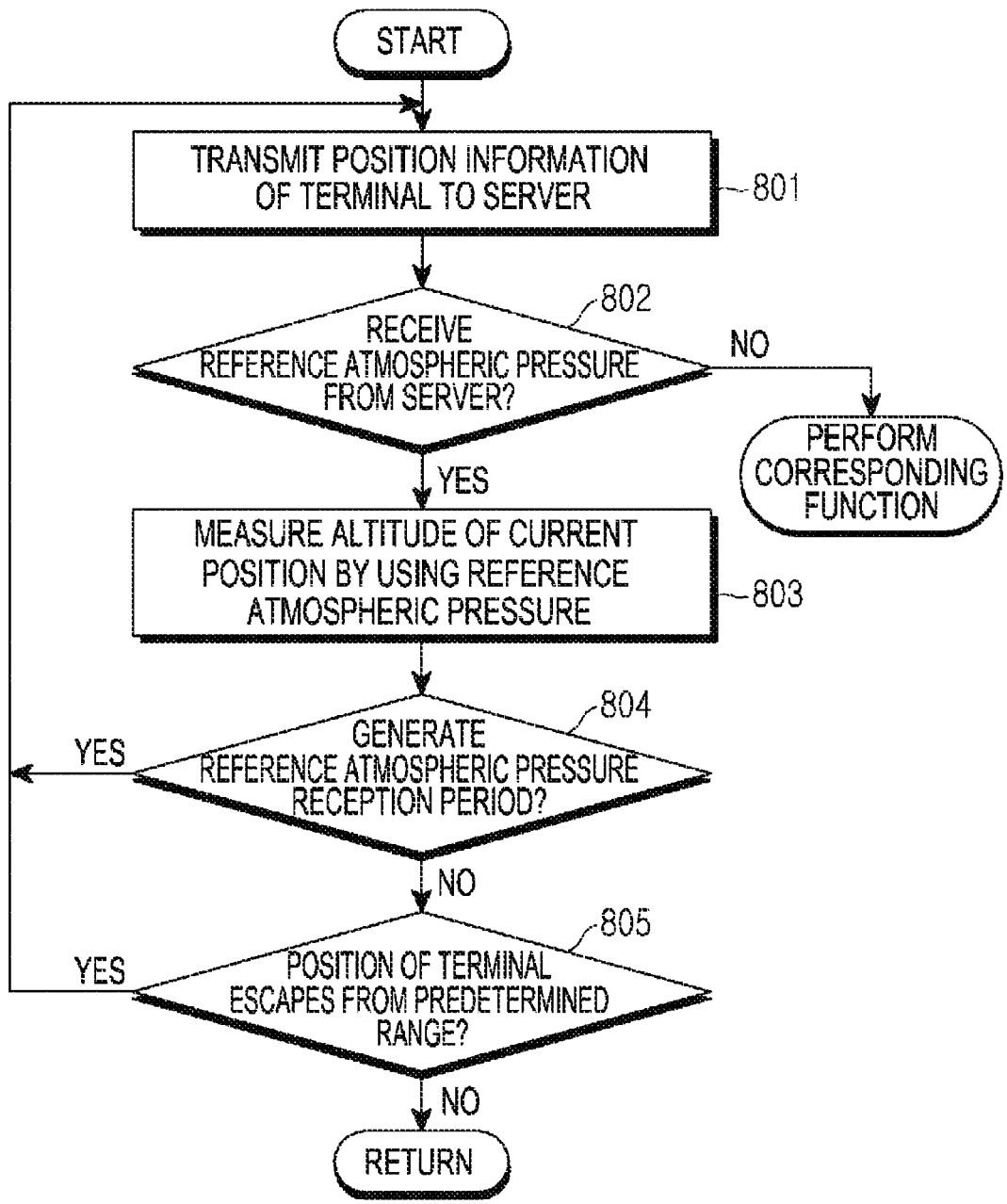
FIG. 8 is a flowchart illustrating a process of measuring an altitude according to a spatial movement change in a terminal according to an exemplary embodiment of the present invention.

FIG. 8 is a flowchart illustrating a process of measuring an altitude according a spatial movement change by the terminal according to an exemplary embodiment of the present invention.

Hereinafter, an exemplary embodiment of the present invention will be described with reference to FIG. 8 together with FIGS. 3 and 4.

Referring to FIG. 8, when a particular application requiring altitude measurement is executed in the terminal 100, the controller 110 transmits current position information of the terminal 100 measured by the position determiner 180 to the server 200 in step 801.

In step 802, the controller 110 determines if the reference atmospheric pressure is received from the server 200. If the controller 110 receives the reference atmospheric pressure in step 802, the controller 110 measures an altitude (h) using the received reference atmospheric pressure and atmospheric pressure measured by the atmospheric pressure measuring unit 170 in step 803. In an exemplary implementation, the controller 110 may determine the altitude (h) using Equation (1). Alternatively, if the controller 110 does not receive the reference atmospheric pressures in step 802, the controller 110 performs a corresponding function.

In step 804, the controller determines if the reference atmospheric pressure reception period should be generated. In a case where the reference atmospheric pressure reception period is not generated, the controller determines whether the current position of the terminal 100 escapes from a preset range in step 805. When the controller 110 determines that the current position of the terminal 100 escapes from a preset range, the controller 110 again performs step 801 of transmitting the current position information of the terminal 100 measured by the position determiner 180 to the server 200.

A distance between the weather stations is generally about 20 to 50 km, but land movements of about 50 to 200 km per hour are possible due to the development of land transportation. Accordingly, the terminal can be moved to another area by the user before the next reference atmospheric pressure reception period is generated after receiving the reference atmospheric pressure from the server 200.

According to an exemplary embodiment of the present invention, the terminal 100 receives a reference atmospheric pressure from the server 200, the controller 110 detects, when a position of the terminal escapes from a preset certain range before a next reference atmospheric pressure reception period is generated, the escape of the terminal, and the controller 110 detects the escape of the terminal, and thus transmits changed current position information of the terminal to the server 200 and receives and uses a reference atmospheric pressure corresponding to the position information, so that the terminal 100 may measure an accurate altitude.

Further, according to an exemplary embodiment of the present invention, when weather information received from the weather information providing server is determined as weather information in which an altitude error may be generated, the controller may organically change and control the certain range.

The exemplary apparatus and method for measuring the altitude of the terminal according to the present invention can be implemented as a computer-readable code in a computer-readable recording medium. The computer-readable recording media include all types of recording apparatuses in which data that can be read by a computer system is stored. Examples of the computer-readable recording media include a ROM, a RAM, a CD-ROM, a CD-RW, a magnetic tape, a floppy disk, an HDD, an optical disk, an optical magnetic storage device, etc. and in addition, include a recording medium implemented in the form of a carrier wave (for example, transmission through the Internet). Further, the computer-readable recording media are distributed on computer systems connected through the network, and thus the computer-readable recording media may be stored and executed as the computer-readable code by a distribution scheme.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An apparatus for measuring an altitude of a terminal, the apparatus comprising:
    an atmospheric pressure measuring unit configured to measure an atmospheric pressure from a barometer included in the terminal;
    a position determiner configured to measure position information of the terminal;
    a processor configured to:
        when a reference atmospheric pressure is not received after a predetermined period that is a reception period of the reference atmospheric pressure, predict a current reference atmospheric pressure by using a plurality of reference atmospheric pressures which are previously received from a server, and
        measure a current altitude by using the predicted current reference atmospheric pressure and the measured atmospheric pressure; and
    a non-transitory memory configured to store the plurality of reference atmospheric pressures.

2. The apparatus of claim 1, wherein the processor is further configured to:
    transmit the position information of the terminal and a reference atmospheric pressure request to the server at the predetermined period, and
    measure, when a reference atmospheric pressure according to the position information of the terminal is received from the server, an altitude by using the received reference atmospheric pressure and the measured atmospheric pressure.

3. The apparatus of claim 1, wherein extrapolation is used as a method of predicting the current reference atmospheric pressure by using the plurality of reference atmospheric pressures.

4. The apparatus of claim 1, wherein, as the plurality of reference atmospheric pressures have increased, the predicted reference atmospheric pressure increases.

5. A method of measuring an altitude of a terminal, the method comprising:
    if a reference atmospheric pressure is not received after a predetermined period that is a reception period of the reference atmospheric pressure, predicting a current reference atmospheric pressure by using a plurality of reference atmospheric pressures which are previously received from a server; and
    measuring a current altitude by using the predicted current reference atmospheric pressure and an atmospheric pressure measured by a barometer included in the terminal.

6. The method of claim 5, further comprising:
    transmitting position information of the terminal and a reference atmospheric pressure request to a server at the predetermined period; and
    measuring, when a reference atmospheric pressure according to the position information of the terminal is received from the server, an altitude by using the received reference atmospheric pressure and the measured atmospheric pressure.

7. The method of claim 5, wherein extrapolation is used as a method of predicting a current reference atmospheric pressure by using the plurality of reference atmospheric pressures.

8. The method of claim 5, wherein, as the plurality of reference atmospheric pressures have increased, the predicted reference atmospheric pressure increases.

* * * * *